Aug. 30, 1960   E. RITTER ET AL   2,950,543
DIDACTIC APPARATUS

Filed Dec. 26, 1956   7 Sheets-Sheet 1

INVENTORS
Eduard RITTER
Paul von Esch by Michael S. Striker
Agent

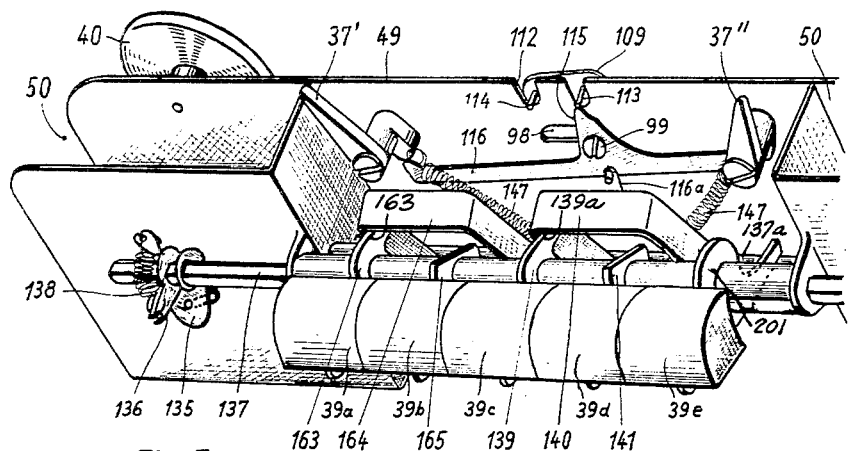
Fig. 7
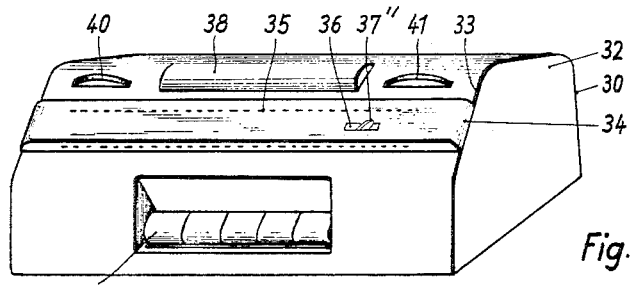
Fig. 5
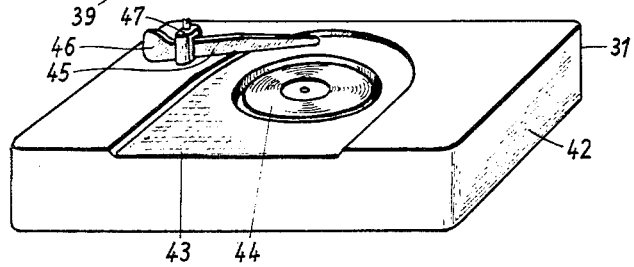
INVENTORS
Eduard RITTER
Paul von Esch
by Michael S. Striker
Agent INVENTORS
Eduard RITTER
Paul von Esch Aug. 30, 1960   E. RITTER ET AL   2,950,543
DIDACTIC APPARATUS
Filed Dec. 26, 1956   7 Sheets-Sheet 7

INVENTORS
Eduard RITTER
Paul von Esch
by Michael S. Striker
Agent

United States Patent Office 2,950,543
Patented Aug. 30, 1960

2,950,543

DIDACTIC APPARATUS

Eduard Ritter, 60 Flughgasse, Zurich, and Paul von Esch, 76 Seestrasse, Kilchberg, near Zurich, Switzerland; said Von Esch assignor to said Ritter Filed Dec. 26, 1956, Ser. No. 630,705

Claims priority, application Switzerland Dec. 4, 1956

11 Claims. (Cl. 35—35)

This invention relates to apparatus for improving concentration in the visual perception of a sequence of graphic or pictorial representations, such as, for example, written texts, illustrated texts, or music texts, for example for educational purposes such as in the teaching of languages. In the normal way, when printed on a page of a book, sequences of representations of this kind are followed line by line by the reader's eye, the eye travelling along the lines and having to jump back at the end of the line in order to find the beginning of the next line.

It has been found that as the result of this continual movement and jumping of the eyes, on the one hand, and of the influence of preceding and following representations, on the other hand, there is a considerable subsidiary strain which reduces the capacity to grasp the sequence of representations.

In contradistinction thereto, according to the invention concentration can be increased to a substantial extent in the visual perception of such sequences by providing an apparatus having an interchangeable text carrier and having means of moving said text carrier in such a manner that the representations appear continuously one after the other in a field of view. Those means of movement which effect continuous running of the text carrier are particularly to be recommended.

The person visually perceiving the representations, whether this is a student endeavouring to impress upon his mind a linguistic text that he is required to learn, a lecturer who desired the text of a lecture to be passed beneath his eyes, a musician who has to play a piece of music, or a shorthand typist transcribing her shorthand notes, can concentrate entirely on the text appearing in the field of vision, without being distracted by preceding or following text, and, even in the event of certain parts having been learned by heart, will have the following parts of the text before the eyes in the limited field of vision, without having to look for them. Students will, for example, absorb a linguistic text substantially more quickly with the aid of the apparatus of the invention, other conditions being equal, than by the hitherto customary methods.

It is true that devices already exist which are intended to facilitate learning to read or the learning of foreign languages; prior publications of this type however relate merely to the convenient association of a picture with the appropriate reading matter, or of a foreign language text with the corresponding text in the native language, but the text does not appear continuously in a restricted field of view.

The text carrier used is preferably a tape running over at least two rotating tape carriers (rollers, drums, reels, wheels, bobbins, or the like), which effect both the forward and the backward movement of the tape. In particular, the tape may be in the form of an open band, which can be wound off one driven tape carrier and on to another driven tape carrier. The tapes can be provided with a sequence of representations transversely to the direction of running, that is to say line by line, or with particular advantage can be provided with a sequence of representations in the direction of running, that is to say in one continuous line.

The sequence of representations can be changed in a simple manner when at least one of the driven tape carriers together with the tape wound thereon is interchangeable. This change can be further simplified by connecting the tape carriers together to form a structural unit which is interchangeable as a whole together with the tape wound on the tape carriers. In particular, the structural unit may have the form of a magazine which is adapted to be closed and inserted in a corresponding mounting in the apparatus. The latter proposal enables even children to operate the apparatus without any danger of the working of the same being impaired in any way.

The tape carriers inserted in this way are advantageously coupled to their driving shaft by manually operable means. The manual operation can be effected in various ways, for example push-button control is advisable.

The tape carriers can be driven by a motor operated at will, the transmission from the motor to the tape carrier drive shaft being effected by means of controllable clutches. Such clutches also serve for the control of the forward and backward movement. For example, one or the other, alternately, of the tape carrier spools is driven in the wind direction.

When certain sequences of representations are to be impressed upon the mind it is advisable to carry out automatic repetition of certain sections of said sequence. This step can be carried out in the new type of apparatus, for example by means of sensing means which are influenced by markings on the text carrier, are adapted to be put out of operation at will, and operate a control for the forward and backward movement which control automatically and as often as desired causes a determined section of the text limited by the markings to run back from the end marking to the initial marking and there switches to forward running again automatically. Mechanical markings, such as notches, stuck-on portions, magnetic markings, such as stuck on small magnetic tabs, electrical markings such as contact pieces applied to the tape, and many others may be used as markings, to which are allotted corresponding sensing means, which may comprise feelers adapted to be influenced mechanically, magnetically, electrically or in another manner.

A further simplification in the learning of certain sequences of representations can be obtained by means which are adapted to be operated at will and by which, when the sensing means are put into operation, the forward/reverse control is adapted to be operated independently of the sensing means within the section determined by the markings. This means that a student who finds a portion of a text between two markings too long can switch manually to reverse running in accordance with the part of the section of the text he wants, whereupon when the initial marking is reached forward running is automatically switched in and the section of the text again runs through the field of view.

In order that the tape may not be unintentionally completely unwound from its carrier which would involve time-consuming refastening of the end of the tape to the carrier, it is advisable for the band to have near its beginning and end special markings by means of which the sensing means are first put into operation (if they have not yet been so) and then influenced in such manner that the text carrier is prevented from continuing to run in the direction of the end in question.

Another possible way of preventing the tape from being torn away from its carrier consists in effecting the drive in the forward and reverse direction through elements acting as a slipping clutch, such as friction wheels, which on too great a load for example when unwinding of the tape from its carrier is no longer possible, because the end has been reached, no longer transmit the torque.

In order to provide adjustment to various speeds of learning or comprehension, it is advisable to provide means adapted to be operated at will for adjusting the drive to various basic speeds. Thus a student can engage a higher speed when repeating certain texts for example. The higher basic speed affords no difficulty in the visual perception since any deflection and subsidiary strain on the eyes is avoided. It is especially advisable to construct the adjusting means required for the speed transmission ratio as friction wheels which can serve at the same time as slipping clutch.

The utility of the apparatus can be increased by arranging the size of the free field of view to be variable. For example, the length of the visible part of the sequence of representations may be shortened to such an extent that a determined number of individual representations is visible which is adapted to the perceptive faculties of the particular viewer. If, as is advisable for example in language instruction, the text carrier carries sequences of representations on a plurality of tracks in appropriate association with one other, for example a text in the mother tongue, a foreign text and a pronunciation text, any track may be covered in order that the student may check whether he has mastered its particular translation.

A further substantial advantage can be obtained especially for language teaching purposes, by arranging the apparatus to have, in addition to the arrangement (visual section) rendering possible the visual perception of sequences of representations (visual text), an aural section giving the corresponding sounds (aural text). This combination of exactly associated visual and aural texts renders possible an optimum effect in mental perception. The ear and eye are completely concentrated on the text and enable it to be impressed upon the mind extremely rapidly.

It is true that learning by means of simultaneous optical indication and acoustic reproduction of sounds is known. However, in such a previously disclosed machine a pointer points in each case to the sounds which correspond to a sound derived from a gramophone record, so that the concentration obtainable according to the invention is neither achieved nor intended.

It is frequently of advantage to construct the visual part and the aural part as separate structural units and to combine the two parts as a comprehensive whole to form the entire apparatus. It is then possible, for example for financial reasons, for only the visual part to be purchased first and the aural part later on. When the aural part contains the entire acoustic equipment including a driving motor, it can be used independently of the visual part for any desired acoustic reproduction.

Transmission means are advantageously provided for the relative infinitely variable adjustment of the speed of the aural text to the speed of the visual text. It is thereby possible not only to make up for slight irregularities in the drive of the visual part and of the aural part, but also to set higher aural text speeds to run in synchronism with the higher visual text speeds within certain limits.

Automatic means may be provided which on operation of the forward/reverse control by the sensing means repeat in the aural part a certain portion of the aural text corresponding to the portion of the visual text, as often as desired.

A particularly simple solution is obtained for the combination of the visual and aural parts by arranging the text carrier for the visual part to serve simultaneously as text carrier for the aural part.

In another form of construction, a gramophone record adapted to be inserted in the apparatus serves as sound carrier, a release button operated at will being provided for ejection of the record.

Further features, advantages and applications of the invention will be clear from the description hereinbelow of two exemplified embodiments in conjunction with the accompanying drawings, in which:

Figure 5 is another embodiment of the apparatus according to the invention, which comprises a visual part and an aural part, the two parts being illustrated separated from one another for the sake of clarity.

Figure 7 is a perspective view of the visual part from the front, the housing again being removed.

Figure 1:
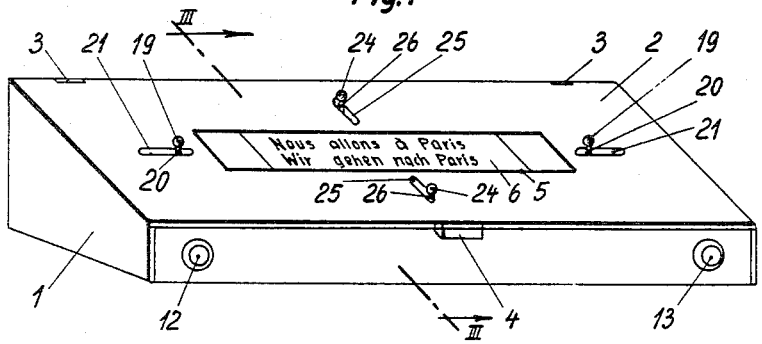
Figure 1 shows an apparatus according to the invention with built-in drive, such as can be used for example, for language instruction.
Figure 2:
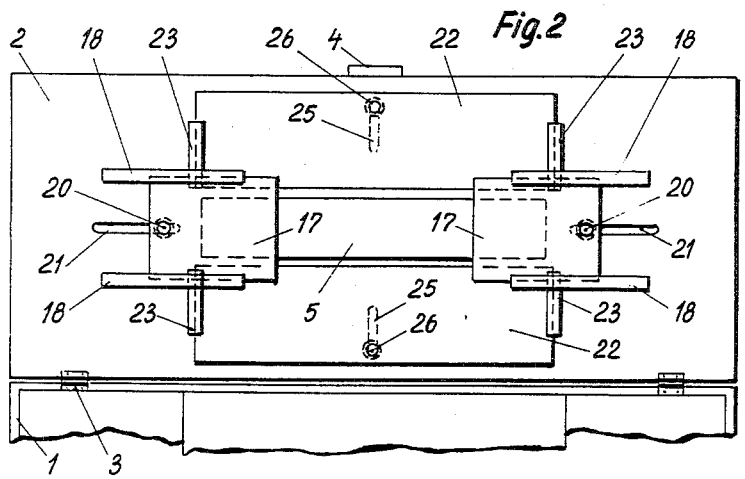
Figure 2 shows the apparatus illustrated in Figure 1, with the lid swung open, the lid being visible from below.
Figure 3:
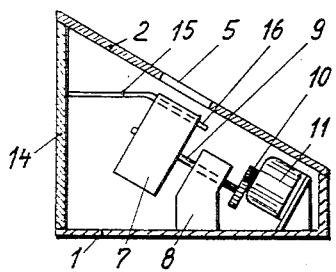
Figure 3 is a cross-section through the apparatus on the line III—III in Figure 1.

The apparatus shown in Figures 1 to 3 has a housing 1 which is closed at the top by a lid 2, which is adapted to swing at the hinges 3 and be swung up by means of a handle 4. In the lid is provided a rectangular opening 5 providing a field of view, in which is visible a tape 6 carrying a sequence of representations. In the present case this is a two-track written text, in which the French words "Nous allons à Paris" and the corresponding German words "Wir gehen nach Paris" (=we are going to Paris) are disposed one above the other, namely in such manner that the German word is situated beneath the corresponding French word in each case.

The text band 6 is unwound from a spool (not shown) disposed in the housing 1 on the right of the opening 5 and wound onto the spool 7 shown in Figure 3. The spindle 9, mounted in a bearing bracket 8, for this spool is driven from an electric motor 11 by means of a gear train 10 indicated here by two gearwheels. The motor can be switched on and off by means of a knob 12 (Figure 1); a knob 13 serves to regulate the motor speed, whether it is with the aid of series resistances, or with the aid of a controllable gear or the like.

On the rear wall 14 of the housing 1 is fastened a plate 15, the front part 16 of which is so bent that it extends parallel to the lid 2 beneath the opening 5. The text band 6 lies on this part of its way from one reel to the other so that it is always smoothed out flat.

The size of the opening 5 can, as illustrated in Figure 2, be reduced in the longitudinal direction by two slides 17 which are slidable in guides 18 fastened on the lid 2. Knobs 19 are provided to operate said slides and are connected to the slides 17 through pins 20 which project through slots 21 provided in the lid 2. The length of the portion of the text visible at any time can thus be altered to correspond to the perceptive faculties of the student. By adjusting two slides 22, which are slidable in guides 23 fastened on the lid 2, the size of the field of view 5 can also be altered in the transverse direction, for example to cover up any track of the corresponding texts. Said slides move between the slides 17 and the lid. They can be slid by means of knobs 24 which are connected to them through pins 26 passing through slots 25 in the lid.

Figure 4:
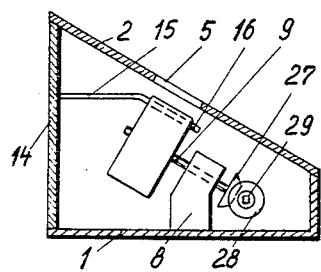
Figure 4 is a section corresponding to Figure 3, for an apparatus with the drive effected from outside.

According to the exemplified embodiment shown in Figure 4, the apparatus does not have its own motor; on the contrary, the driving mechanism 27, 28 consisting of two bevel gears is operated by a square coupling shaft 29 which can be operated from outside in any desired manner. For example, the drive is effected through a flexible coupling shaft by a sound reproducing apparatus of any desired kind, for example with magnetic sound tape, which is equipped with a corresponding coupling. The text band and the sound band can then be run in synchronism so that a student simultaneously reads and hears the words appearing in the field of view, thus guaranteeing effective self-instruction. It is also possible to place a crank over the square shaft and drive the take-up spool by hand.

Figure 5 shows another exemplified embodiment of the invention. This apparatus consists of a visual part 30 and an aural part 31, which are each constructed as a separate structural unit and are capable of being combined as a comprehensive whole to form the entire apparatus. The visual part 30 is also usable alone. In the drawing the two parts are shown parted from one another for the sake of clarity.

The visual part has a housing 32, in whose inclined front wall 33 is inserted a closable magazine 34 (see also Figure 10) which is provided with a transparent cover plate and in which is disposed the text band 35. Markings, here the slot 36, in the tape 35 influence feelers, here the feeling levers 37, by means of which certain desired automatic controls can be initiated. Under the raised portion 38 is disposed a lamp to illuminate the text band. The keyboard 39 serves for the initiation or accomplishment of the requisite control processes, if they have to be effected manually. The adjustment wheel 40 serves for the regulation of the text band speed; the adjustment wheel 41 serves for the adjustment of the gramophone record turntable speed.

The aural part 31 has a casing 42 in which are accommodated the parts required for the acoustic reproduction, for example amplifier, loudspeaker and ancillary equipment. At its top the casing has a recess 43 in which a gramophone record can be inserted. The turntable 44 is adapted to be raised and lowered so that by means of said turntable the inserted record can be pressed against the driving table located on the visual part 30 (not shown in this figure). The pick-up 45 can be raised or lowered from the visual part by means of a slide acting on the end 46 and be swung by means of a shaft acting on the spindle 47.

Figure 6:
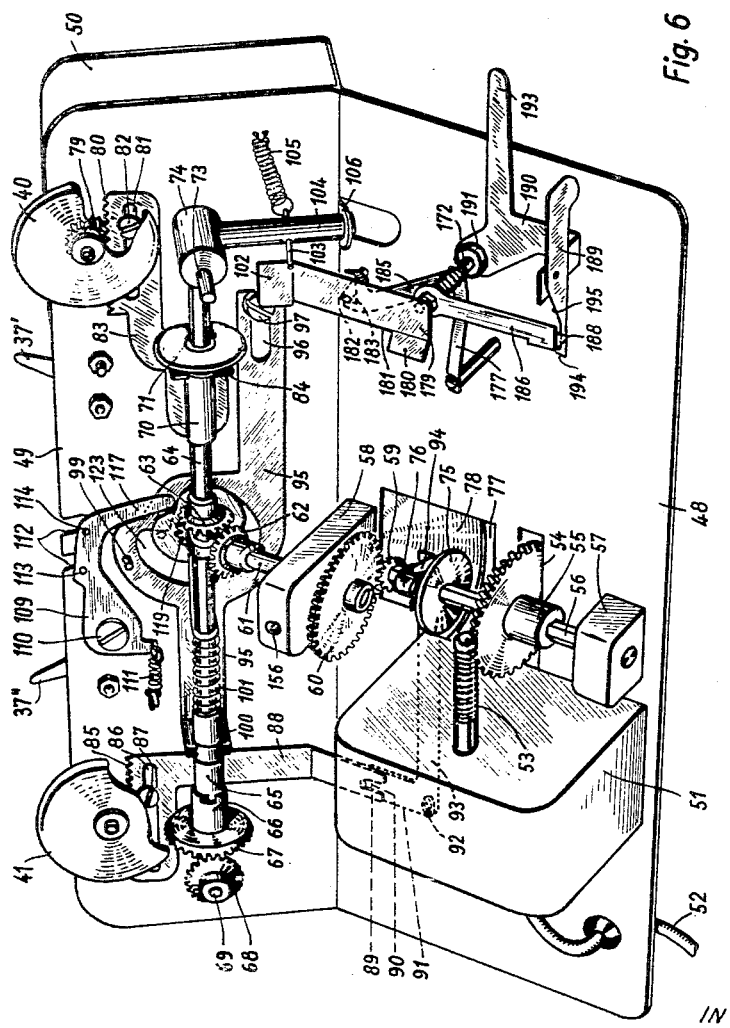
Figure 6 is a perspective view of the visual part from above, the housing being removed.
Figure 9:
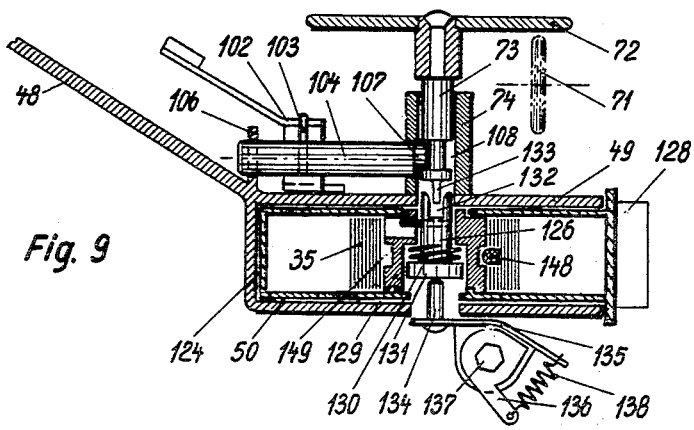
Figure 9 is a section through the clutch of a tape carrier spool which clutch effects the drive.
Figure 10:
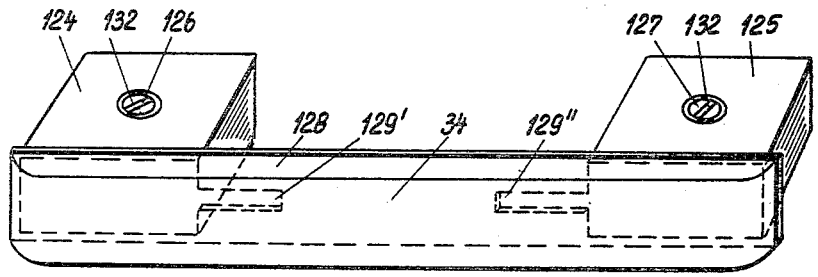
Figure 10 is a closable magazine for receiving a tape and the corresponding carrier spools, which can be inserted in the apparatus as a unit.
Figure 11:
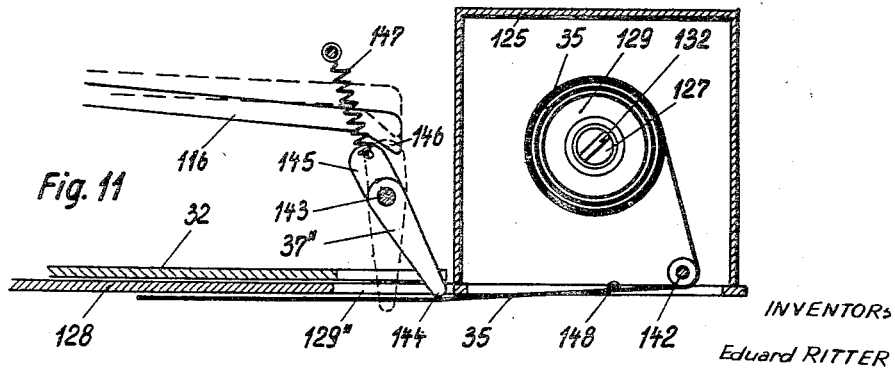
Figure 11 is a plane section through a magazine inserted in the apparatus, showing the operation of the sensing levers.

Figures 6 and 7 show the visual part with the housing 32 removed. The driving and control mechanism is mounted substantially on a rear horizontal plate 48 and an adjoining plate 49 extending at an angle therefrom. The plate 49 has on its underside compartments 50 into which can be inserted the reel boxes of the closable magazine 34 (Figures 9 to 11).

A driving motor 51 is mounted on the upper side of the plate 48 and is fed via an electrical lead 52. The output shaft of the motor 51 is constructed as a worm 53 and acts on a worm wheel 54, which is mounted rigidly by its hub 55 on the hexagonal shaft 56. The latter is held in the bearing brackets 57 and 58. Near the bearing bracket 58 it has a pinion 59 which meshes with a gearwheel 60 which in turn drives the shaft 61, which is also held in the bearing bracket 58 and which carries a bevel gear 62 and its other end. The said bevel gear drives a bevel gear 63, which is disposed at right angles to it and which is in turn rigidly mounted on a hexagonal shaft 64. At its left hand end, in Figure 6, said shaft 64 carries a clutch dog 65, which is slidable thereon and which can engage with a corresponding clutch part 66 on the bevel gear 67. By means of the latter bevel gear a bevel gear 68 is driven, said bevel gear 68 being connected with the driving shaft 69 for the reversing spool. Near its other end the hexagonal shaft 64 has a friction wheel 71, slidably engaged thereon by means of hub 70 and which can engage with a friction plate 72 of larger diameter (Figure 9). Said friction plate is mounted on the driving shaft 73 for the other forward running spool and is guided in a bearing sleeve 74.

The drive for the disc record player is also derived from the same motor 51. For this purpose a friction wheel 75 is slidably mounted with its hub 76 on the hexagonal shaft 56. The friction wheel extends through an opening 77 in the horizontal plate 48 and engages with a friction plate 78 on the underside of the plate 48.

To regulate the tape speed for forward running, that is to regulate the speed of revolution of the driving shaft 73, the regulating disc 40 is provided, which projects forwardly from the housing 32 (Figure 5). A gearwheel 79 is connected to this disc and meshes with the toothed rack 80 of a slide 83 guided by a slot 81 and screws 82. At its other end the slide has a fork 84 which extends upward and which engages around the hub 70 of the friction wheel 71 and on displacement of the regulating disc 40, moves said friction wheel in the direction of the shaft 64 or in the direction of the radius of the friction plate 72 and thus varies the transmission ratio. On the disc 40 four speed ranges can be indicated by colours for example, so that the user can select the band speed corresponding to his capabilities or requirements.

For the purpose of adjusting the record speed the regulating disc 41 is provided which projects at the other end of the front side from the housing 32. In this case too, a gearwheel (not shown) operates the toothed rack 85 of a slide 88 guided by a slot 86 and screws 87. A fork 89 at the end of the slide engages round a pin 90 of an angle lever 91, which is rockable about the point 92 and carries at the end of its longer lever arm 93 an upwardly extending fork 94 which encircles the hub 76 of the friction wheel 75. On displacement of the slide 88 the friction wheel 75 is slid in the direction of the hexagonal shaft 56 or in the direction of the radius of the friction plate 78 whereby the transmission ratio for the drive of the record can be varied in similar manner to the band speed adjustment.

In order to run the text tape forwards and backwards, one or the other tape reel is driven. The change-over from one reel to the other is made by means of a slide 95, which is guided by the slot 96 and screw 97 and with the aid of the slot 98 and screw 99. At its left end (in Figure 6) the slide carries a bent-up fork 100 engaging with the dog 65. When the slide 95 is brought into its left-hand end position, the teeth of the dog engage in the clutch part 66 and the return reel is driven. In order that this engagement may be made in all cases, even if the teeth of the dog and the clutch groove are not in the first instance accurately aligned, a spring 101 is provided, which on the rotation of the shaft 64 presses the parts into engagement. If the slide 95 is brought out of this position into its right-hand end position, the dog clutch 65, 66 is disengaged. At the same time, at the right-hand end, an offset portion 102 of the slide 95 strikes against a pin 103, which engages transversely through a post 104 and by means of the spring 105 is held constantly bearing against the offset portion 102. The post 104 is mounted at one end in the bent-over plate 106 and at the other end in the bush 74.

On the rotation of the post 104, an eccentric 107, which is situated at its front end and which engages in an annular groove 108 in the driving shaft 77, is rotated and thereby presses the driving shaft 73 toward plate 49, whereby the friction plate 72, which was previously lifted off the friction wheel 71, is pressed on to the latter and thus the driving connection for the forward running reel is established. On the movement of the slide 95 in the opposite direction the friction wheel 72 is again lifted off the friction plate 71, and at the other side coupling is effected with the reverse running reel.

Figure 7B:
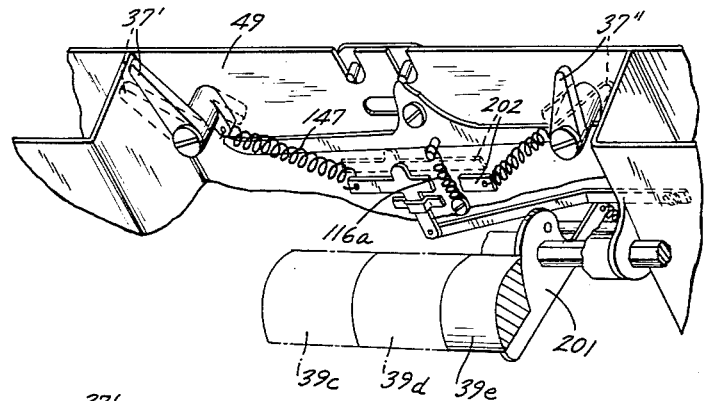
Fig. 7b is a fragmentary perspective illustration of one of the operating keys and the structure associated therewith.

The reversal is initiated with the aid of an angle lever 109 which is rockable about the pivot point 110 and is biased in the clockwise direction as viewed in Fig. 6, with the aid of a spring 111. This angle lever is normally slightly raised and thus put out of action by pins 113 and 114 on lever 109 which project through slots 112 in the plate 49 and which are supported on the underside of the plate 49 (Fig. 7) by the point 115 of a rocking lever 116 which is rockable on the pivot point 99. As soon as the support of the pin 113 or 114, which is supported at any given moment, is interrupted by the nose-piece 115, by any action, for example either by operation of the sensing lever 37′ or 37″ or by depression of a corresponding key 39e on the keyboard 39, the angle lever 109 turns in the clockwise direction, its front end 117 presses downwards on a cam 118 and rotates the latter slightly in the clockwise direction. A bevel gearwheel 119 is rigidly joined to the cam and its teeth are ground away on two opposite areas 120 (Figure 8). When the angle lever 109 slightly turns the cam 118 and hence the gearwheel 119, the gearwheel comes into engagement with a bevel wheel 63, so that the bevel wheel 119 and the cam are rotated by the latter by about 180°. A pin 121 eccentrically mounted on the cam is thereby likewise moved and presses against the stop surface 122 of the recess 123 of the slide 95 and pushes the slide 95 to the right. At the same time the rocking lever 116 joined to the slide 95 is pushed in the same direction and engages by its point 115 beneath the other pin 114. A spring 116a (Fig. 7) ensures that the rocking lever assumes the inclination required for the purpose when the reversal is made. The spring 116a diagrammatically illustrated in Fig. 7 is an over-center spring connected at one end to a pin fixed to and extending from the rock lever 116 and fixed at its opposite end to the wall 49 so that when the lever 116 is tilted in one direction the spring 116a will yieldably maintain the lever 116 in the position to which it has been tilted until the lever 116 is tilted to the opposite inclination, and then spring 116a yieldably maintains the rock lever 116 at the latter opposite inclination until it is tilted back to its first inclination. In this way the drive in one direction continues until the inclination of lever 116 is changed, and then the drive continues in the opposite direction until the inclination of lever 116 is again changed. If on the initiation of another reversal operation the support by the rocker nose-piece 115 is withdrawn from the pin 114, the process described above is repeated, the slide this time being pushed from right to left (Figure 6). In this way the forward and reverse reels are driven alternately.

Reference is now made to Figures 9 and 10, in which the cassette 34 containing the tape and the coupling of the reels contained in it together with appertaining driving shafts are illustrated. The cassette 34 has two reel boxes 124 and 125 for the forward and reverse reels, and on the upper sides of these boxes the ends of the reel shafts 126 and 127, respectively, are visible. The two reel boxes are joined together by a guide track 128, which, on its front side, is transparent. On its rear side this guide track has two incisions 129′ and 129″, through which the sensing levers 37′ and 37″ (Figure 7) project into the path of the text tape.

This cassette with its two reel boxes 124 and 125 is pushed into the compartments 50 beneath the inclined plate 49, and by operation of the keys 39c and 39d can be coupled to and uncoupled from the driving mechanism. The reel case 124 (the same applying to the reel case 125) has in its interior a reel body 129 around which tape 35 is wound. The shaft 126 of the reel is pressed downwards, as viewed in Fig. 9, by means of a coil spring 130 which bears against a collar 131. At its other end this shaft has a gripping claw 132 in which a cross-piece 133 on the lower side of the driving shaft 73 can engage. The reel shaft 126 is pressed upwards (Fig. 9), for the purpose of coupling, with the aid of a pin 134 which is fastened on a plate 135. This is done with the aid of the lever 136, which is mounted on the hexagonal shaft 137 and is connected to the plate 135 by way of a tension spring 138. The shaft 137 is in turn operated by depression of the key 39c, whereby a notched lever 139 comes into engagement with a drop stirrup 140. The reverse rotation of the shaft 137 for the purpose of uncoupling the reel from its driving shaft is effected on operation of the key 39d, which by its sector disc 141 slightly raises the drop stirrup and thereby releases the locking of the latter to the notched lever 139.

Figure 7A:
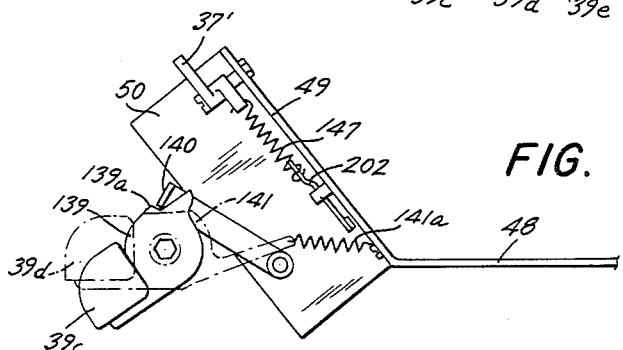
Fig. 7a is a transverse view of the structure of Fig. 7.
Figure 8:
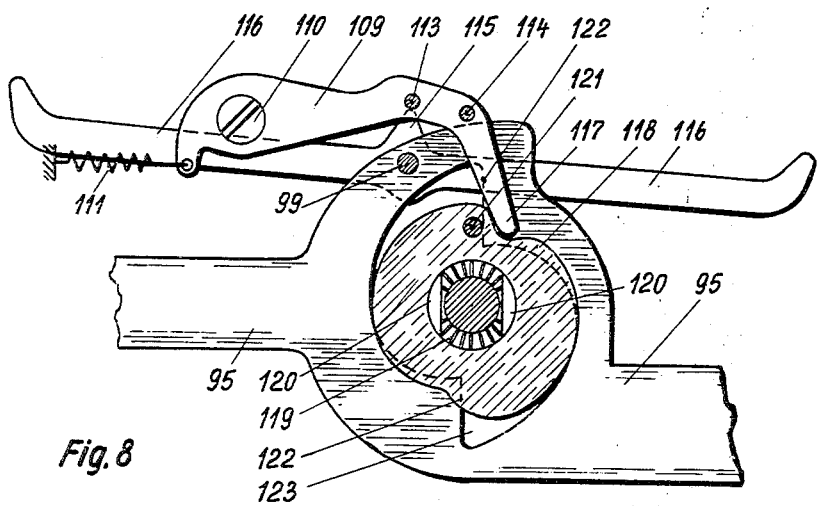
Figure 8 is a plan view of the control for the forward/reverse change-over mechanism.

As may be seen from Fig. 7, the hexagonal shaft 137 is supported for turning movement by a pair of ears extending from the compartments 50. The structure shown at the lower part of Fig. 9 is also shown at the left end of the shaft 137 in Fig. 7, and duplicate structure is located at the opposite end of shaft 137 for cooperation with the reel in the right compartment 50 of Fig. 7. The key 39c is fixed to the shaft 137 so that when the key 39c is depressed the shaft 137 turns in a clockwise direction, as viewed in Fig. 9, and as a result the lever 136 turns with the shaft 137 and acts through spring 138 on element 135 which is freely turnable with respect to shaft 137 to turn the plate 135 also in a clockwise direction to the position shown in Fig. 9. The spring 138 is stronger than the spring 130. The corresponding structure at the right end of shaft 137, as viewed in Fig. 7, operates simultaneously in the same way. The plate 139 is fixed to the key 39c for turning movement therewith and is formed at its upper edge with a notch 139a (Fig. 7a). The element 140 rests by gravity on the top edge of plate 139 and enters into the notch 139a thereof after depression of key 39c so as to maintain this key depressed and so as to maintain the parts in the position shown in Fig. 9. An unillustrated spring is coiled about the shaft 137, has one end fixed to this shaft, and has an opposite end fixed to a stationary part of the device such as a wall of one of the compartments 50, and this spring urges the shaft 137 to turn in a counterclockwise direction, as viewed in Fig. 9, back to its rest position, the stirrup 140 cooperating with the notch of plate 139 to prevent the shaft 137 from being turned by the unillustrated spring back to its rest position. The key 39d is freely turnable with respect to the shaft 137 and a spring 141a cooperates with plate 141 fixed to key 39d to yieldably maintain the latter in its rest position shown in Fig. 7a. When the key 39d is depressed the plate 141 which is fixed to the key 39d to turn therewith engages the stirrup 140 and raises the latter out of the notch of plate 139 so that the shaft 137 then returns to its rest position to disconnect the drives to the reels in the compartments 50, respectively. The operator then releases the key 39d which automatically turns to its rest position.

Figure 11 shows a cross-section through a reel box and also the sensing lever control. The tape 35 runs from the reel 129 over a guide roller 142 into the guide track 128. In the housing 32, in a position corresponding to the opening 129″, an aperture is provided through which the sensing lever 37″ projects, said lever being rockable about an axis 143 while its point 144 is normally held down by the tape. At its other end, this sensing lever has an operating cam 145, which, on the rotation of the lever acts on the end 146 of the rocking lever 116 and brings it from the position shown in solid lines to that shown in broken lines. A spring 147 ensures that the lever 37" is urged to assume the position in which it engages in the next tape.

When a marking in the form of a slot 36 now appears in the tape, the lever 37" engages therein, is pulled by it in the direction of movement of the tape into its position shown in broken lines and thereby operates the rocking lever 116 which in turn initiates the reversing movement for the running of the tape. A similar sensing lever is provided on the other side of the rocking lever 116, so that with the aid of slots 36 of this type the forward and reverse movement of the tape are automatically effected for the purpose of repeating the portions of text situated between the markings.

The key 39e is so constructed that on its depression the sensing levers 37' and 37" are first moved into the inoperative position, so that when the slots move past the sensing levers no reversing is effected. In order, however, to prevent the breaking of the tape when it has run off from one of the reel bodies 129, even when the lever 37" is in its inoperative position, special markings (in the present case, stuck on protuberances 148) are provided on the tape and normally engage in corresponding depressions 149 in the reel body. These protuberances act on the point 144 of the lever 37", first bringing the lever into its operative position, and then move it further so that the rocking lever 116 is operated by its cam 145 and the reversing movement is thereby effected.

When the key 39e is still further depressed, the rocking lever 116 can be deliberately operated and the reversal of the running of the tape thus effected by hand.

The key 39e is connected to the shaft 137 for free turning movement with respect thereto and is fixedly connected with a plate 201 shown at the right of Fig. 7b and having a rearwardly directed extension which acts on the lever assembly 202 connected with the springs 147 so that when the key 39e is depressed this lever is actuated to act through springs 147 on the sensing levers 37' and 37" for turning the latter. As is shown in Fig. 7b, when the key 39e is depressed through a first distance the lever assembly 202 and springs 147 controlled by key 39e turn the elements 37' and 37" to an inoperative position shown in dotted lines in Fig. 7b, while when the key 39e is depressed beyond this first distance the levers 37' and 37" turn to rock the lever 116 so that the direction of drive can be manually changed in this way at the will of the operator. At any given instant one end of lever 116 is at a higher elevation than the other, and the higher end of the lever 116 will be acted upon by the element 37' or 37" located adjacent thereto to tilt the lever 116 in the opposite direction for changing the direction of drive whenever the key 39e is depressed beyond the above first distance. When the operator notices a slot in the tape approaching the first of the sensing levers, the operator depresses the key 39e to render the levers 37' and 37" inoperative, and the key 39e is maintained in this position until this first slot moves beyond both of the sensing levers. Then the operator releases the key 39e so that the sensing levers again become operative. When the second slot reaches one of the sensing levers the drive will be reversed automatically in the above-described manner until the first slot returns to the other sensing lever and then the drive is again reversed automatically. In this way material on the tape between the two slots is automatically placed repeatedly before the viewer until the key 39e is again depressed to permit the tape to move on with the slots moving past the sensing levers which are rendered inoperative at this time.

Figure 12A:
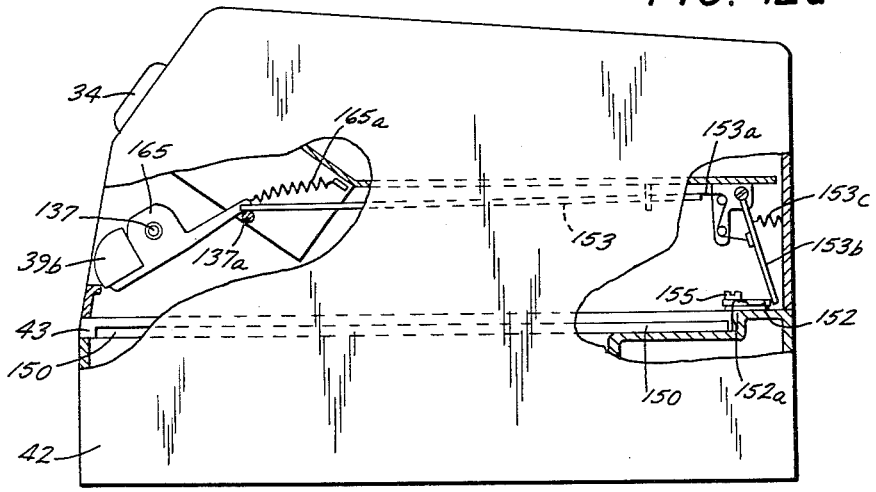
Figure 12a illustrates a linkage connected with one of the operating keys of the structure of the invention.
Figure 12:
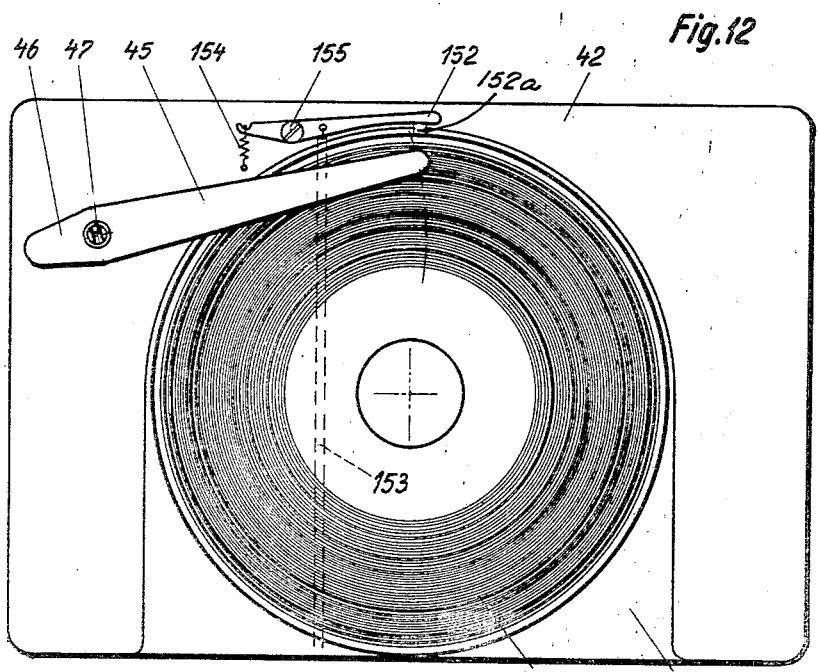
Figure 12 is a plan view of the aural part with the gramophone record inserted.
Figure 13:
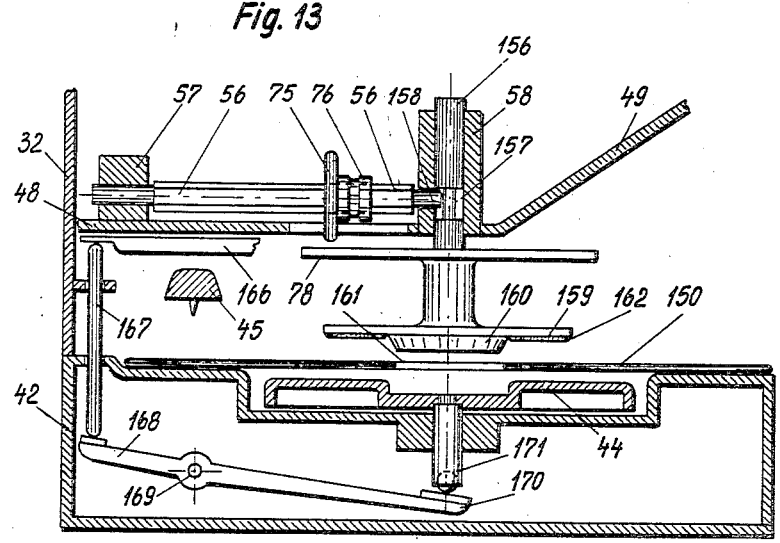
Figure 13 is a cross-section through the bottom half of the visual part and through the aural part, showing the coupling of the visual part to the aural part.
Figure 14:
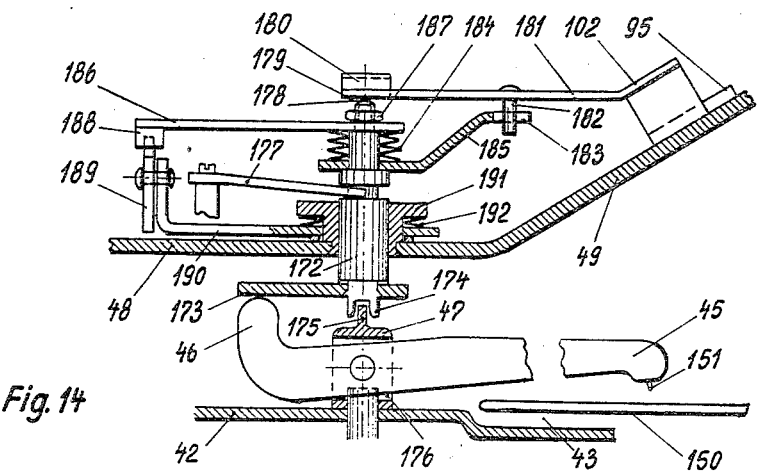
Figure 14 is a section through the control mechanism for the sound pick-up.

In Figures 12 to 14 the aural part 42 is illustrated in greater detail. A gramophone record 150 can be inserted in the slot 43 in the box 42 so that the stylus 151 of the pick-up 45 is situated above the grooved part of the gramophone record. An ejector 152, which can be operated by means of the key 39b, can be turned about its pivot point 155 by pulling the rod 153 to overcome the force of the spring 154, whereby the gramophone record 150 is pushed slightly forwards. The key 39b is connected through a linkage shown in Fig. 12a with the rod 153 for pulling the rod 153 when the key 39b is depressed. Referring to Fig. 12a, it will be seen that the key 39b is connected to a plate 165 which is turnable on the shaft 137 and which is fixed to one end of a spring 165a the opposite end of which is fixed to a stationary part of the structure so as to yieldably hold the plate 165 against a stop bar 137a which determines the rest position of all of the keys, this stop bar 137a also being visible in Fig. 7. The rear end of the plate 165 is connected with one end of a rod 153 supported for axial movement to the right and left as viewed in Fig. 12a by a suitable bracket, and the rear end of the rod 153 is fixed to a flexible strip 153a guided over suitable stationary guide rods as shown in Fig. 12a and fixed at its end distant from the rod 153 to a lever 153b supported at its top end for turning movement and fixed to a spring 153c which urges the lever 153b to the position illustrated in Fig. 12a. The bottom end of the lever 153b engages the rear edge of the lever 152 which carries an extension 152a extending downwardly to a position behind the disc 150. Thus, when the operator turns the key 39b in a counterclockwise direction, as viewed in Fig. 12a, in opposition to the spring 165a, the rod 153 will be pulled to the left as viewed in Fig. 12a, thus pulling on the strip 153a and turning the lever 153b in a clockwise direction so as to move the lever 152 and its extension 152a to the left, as viewed in Fig. 12a, thus ejecting the disc 150 at least to a position where the left edge of the disc 150, as viewed in Fig. 12a, projects beyond the structure by a distance sufficient to enable the operator to grasp the disc 150 without any difficulty and remove it from the apparatus.

As already mentioned, the gramophone record is driven through the friction wheel 75 which acts on the friction plate 78. This friction plate is mounted on a shaft 156 which has an annular slot 157 which is slightly wider than the appertaining end, acting as locking bolt 158, of the hexagonal shaft 56. This locking is necessary in order to prevent the shaft 156 from falling downwards; the slightly greater width of the annular slot 157 enables the friction plate to be slightly raised in order to bring it into engagement with the friction edge 75, while normally there is no coupling. Beneath the friction plate 78 is situated the driving plate 159 for the gramophone record, which at the bottom carries a conical projection 160 which in turn engages in the central hole 161 in the record when the latter is lifted, and thus centers the same. In addition, the driving plate 159 carries on its lower side a friction lining 162 of rubber, felt, or the like.

In order to effect the coupling between the gramophone record and the driving mechanism, the key 39a is depressed. It is held in its lower position because the appertaining catch 163 which turns with key 39a has a notch 163a which comes into engagement with the drop stirrup 164 (Fig. 7). The release of the key 39a and hence the uncoupling of the gramophone record from its driving mechanism are effected by depression of the key 39b, the sector disc 165 of which slightly raises the drop stirrup and hence releases the key 39a. The parts 163 and 165 are respectively connected with keys 39a and 39b and cooperate with the stirrup 164 in the same way as has been described above in connection with keys 39c and 39d and elements 139—141. The operation of the key 39a, the push element 167 is depressed by means of the intermediate element 166 connected through an unillustrated linkage with key 39a to be operated thereby, and said element presses in turn on the short end of a lever 168 which is rockable about the shaft 169. As a result, the other end 170 of the lever is raised and presses the stub shaft 171 of the record plate 44 upwards. The record plate first bears against the gramophone recrod, then lifts the latter and brings it into engagement with the driving plate 159, then raises the record together with the driving plate and appertaining friction plate 78 until the latter comes into engagement with the friction wheel 75. From that moment onwards, the gramophone record is coupled to its drive and begins to turn.

As can be seen from Figures 6 and 14, the apparatus is equipped with an automatic placing and raising device and with an orientating device for the pick-up. An adjusting shaft 172 carries at its bottom end a sector plate 173, with the aid of which the end 46 of the pick-up arm 45 can be pressed down and thus the stylus 151 can be raised from the gramophone record 150, and also a dog clutch 174 which can slide over a dog 175 of the rotating bearing 176 for the pick-up arm, so that through the rotation and axial movement of the adjusting shaft 172 the desired movements can be brought about.

The shaft 172 is urged upwards by a leaf spring 177 and lies with its end 178 against the bearing surface 179 which has an inclined ramp surface 180 and is mounted at the outer end of an arm 181 joined to the slide 95. If the slide 95 is pushed towards the right-hand side (in Figure 6) for the purpose of engaging the forward running reel, the end 178 first slides under the inclined ramp 180 and if desired is completely freed, so that the adjusting axis 172 can be raised and the pick-up arm 75 thus lowered. Conversely, on switching back to the reverse reel and on a corresponding movement of the slide 95 to the left, the adjusting axis 172 is pressed down by the bearing surface 179, 180 and hence the pick-up arm 45 is raised.

The arm 181 is equipped with a pin 182, which engages in the fork 183 of a lever 185 pressed against the adjusting shaft 172 by dished springs 184. If the slide 95 is now moved to the left, for the purpose of changing over to the reverse running reel, not only is the pick-up arm raised, but through the co-operation of the pin 182 and the lever 185 it is also swung back. In order that the pick-up arm may first be slightly raised and only then turned back, the forked cut-out 183 in the lever 185 has a certain amount of play in relation to the pin 182.

In order that the precise starting position for the pick-up arm may be repeatedly located, an arm 186 is rigidly mounted by means of the nut 187 on the adjusting shaft 172. This arm carries at its front end a latch 188 which is adapted to co-operate with the stop, determining the starting position, of a locking lever 189, which in turn is pivotally secured to a rocking plate 190. The rocking plate is subjected through a cup spring 192, supported against the bush 191 for the adjusting axis 172, to friction such that rocking is possible only through the action of an external force on the lever arm 193, but not through the other forces occurring in the system. When the forward running reel is engaged, and the adjusting axis 172 is raised, the latch 188 is disengaged from the slot in the locking lever 189, so that the adjusting axis 172, together with the pick-up arm, can freely turn in the clockwise direction. On changing over to reverse running, the adjusting axis and the pick-up arm are returned with the aid of the pin 188; the latch 182 then slips over the inclined front edge 194 of the lever 189 as far as a point, dependent on the turning movement, in the recess 195 in the locking lever 189. On then changing over to forward running, the pin 182 again drives the lever 185. However, as soon as the latch 188 strikes against the stop of the locking lever 189, the adjusting axis 172, and hence the pick-up arm, cannot continue to turn until the adjusting shaft passes under the ramp 180 and is raised. In the meantime, the lever 185 is inoperatively rocked about the adjusting axis. The stop of the locking lever 189 thus determines the respective starting position, which is accurately adjustable by turning the rocking plate 190.

The apparatus operates as follows:

The cassette 34, with its reel boxes, is first inserted in the compartments 50 provided for the purpose, and the appertaining gramophone record is inserted into the slot 43 until it bears against the stop at the rear. By depression of the key 39c the reel shafts 126 are pressed up and coupled to their respective driving shafts; at the same time the motor 51 is switched on. By depression of the key 39a the record plate 44 is raised and the gramophone record is centered and brought into connection with its drive. The text tape, for example, now moves in the forward direction and the appertaining aural text is played by the gramophone record. If the sensing lever 37″ comes into engagement with a slot marking 36 on the tape, the running of the tape is reversed, and at the same time the pick-up arm is raised off the record and turned back. When the sensing lever 37′ then comes into engagement with a slot marking 36, the running of the tape is reversed again so that it runs forwards, the pick-up arm is first brought into its starting position fixed by the rocking plate 190, and is there lowered. The starting position can be accurately allocated to the beginning of a section of the visual text, determined by the marking. The reversals just mentioned can also be made by depressing key 39e into its lowermost position by hand. If the key 39e is only slightly lowered, the sensing levers 37′ and 37″ are lowered outwards and thus put out of action. The forward or reverse running of the tape is in this case not automatically interrupted, so that the tape can continue to run in the same direction to the beginning or end when the key 39e is continuously depressed, or to the next marking when it is depressed for a short time. If in this way a new part of the text of the tape, which has to be repeated several times, is adjusted, the respective beginning position of the pick-up arm on the gramophone record can be fixed with the aid of the rocking plate 190 by adjustment of the lever arm 193. In order to switch off the apparatus, the key 39d is depressed, whereby the motor is switched off and the reel shafts 126 are brought out of engagement with their driving shafts 69 and 73 respectively. By depression of the key 39b, the record plate 44 is lowered and at the same time the ejector is operated, which pushes the gramophone record out of the slit 43 sufficiently forwards for it to be seized and withdrawn comfortably.

Although the representation of the texts to be impressed has been effected on a tape in the embodiments illustrated by way of example, the invention can also be performed in other ways. Thus, for example, the carrier for the representations could also be a page, instead of a tape, the words being arranged thereon one above the other in appertaining lines. This page could be moved, by any suitable feed means, behind the field of view in a direction perpendicular to the direction of the tape. However, a disc or cylinder can also be used as the carrier for the text. In addition, it is convenient in many cases to use as the text carrier a band of film, for example a micro-film band. In which case, the representations to be viewed would be made visible by projection on a ground-glass screen or the like.

In addition, the apparatus can be mounted, preferably at eye level, above a typewriter or other office machine, so that a touch typist can concentrate entirely on the text appearing in the field of view. The regulation of the speed of the text band and the switching on and off of the running of the band can be effected effortlessly, for example by means of a remote control operated by finger pressure or a foot switch. If in this connection use is made of rolls of paper tape, these can be written on continuously; the typist will in many cases write even more quickly, because during writing there will be no jump from line to line. Given selection of a suitable apparatus, the writing hand can even be left in one position, while the band moves along beneath the hand.

We claim:

1. Apparatus for presenting information both visually and aurally, comprising, in combination, first means for movably supporting a visual information carrier and forming a first unit; second means for movably supporting an aural information carrier and forming a second unit distinct from said first unit; connecting means cooperating with said first and second means for releasably interconnecting the same and for synchronizing the movement of said carriers; drive means carried by said first and second means for driving said carriers in forward and rearward directions; operating means for reversing the direction of drive of said drive means; and control means carried by at least one of said first and second means and cooperating with said operating means for actuating the latter and for thereby controlling said drive means to automatically repeat as many times as desired a selected portion of the information on said carriers.

2. Apparatus as recited in claim 1 and wherein said visual information carrier includes actuating means which cooperate with said control means to cause the latter to start the repetition of a selected portion of said carriers.

3. Apparatus as recited in claim 2 and wherein said visual information carrier is in the form of a band formed with cutouts, and said cutouts forming the actuating means which cooperate with said control means.

4. Apparatus as recited in claim 1 and wherein said control means includes feelers located in the path of movement of said visual information carrier, the latter having surface irregularities which cooperate with said feelers to actuate the latter for causing repetition of information between the irregularities.

5. Apparatus as recited in claim 4 and wherein a manually operable means cooperates with said control means for regulating the movement of the information carriers independently of said control means.

6. Apparatus as recited in claim 1 and wherein a means is carried by said visual information carrier and cooperates with said control means for preventing said visual information carrier from being driven beyond an end thereof.

7. Apparatus as recited in claim 1 and wherein said drive means includes motion transmitting elements which cooperate frictionally with each other so that they are capable of slipping with respect to each other.

8. Apparatus as recited in claim 1 and wherein a means forming a third unit independent of said first and second units carries said visual information carrier and is removably supported by said first unit so that one of said third units may be removed from said first unit and replaced by another third unit.

9. Apparatus as recited in claim 8 and wherein said third unit includes a pair of spaced reel housings, said first unit having a pair of compartments for respectively receiving said housings.

10. Apparatus as recited in claim 1 and wherein said second unit includes a manually operable means for determining the portion of the aural information carrier which is to be repeated.

11. Apparatus as recited in claim 1 and wherein said aural information carrier is in the form of a disc recording and said second unit includes an ejector means for ejecting the recording from the second unit.

References Cited in the file of this patent

UNITED STATES PATENTS

| | | |
|---|---|---|
| 1,100,591 | Madaler | June 16, 1914 |
| 1,170,325 | Poposkey | Feb. 1, 1916 |
| 1,863,789 | Hall | June 21, 1932 |
| 1,930,286 | Runyan | Oct. 10, 1933 |
| 2,092,761 | Klein | Sept. 14, 1937 |
| 2,177,638 | Draeger | Oct. 31, 1939 |
| 2,279,119 | Freimann | Apr. 7, 1942 |
| 2,357,593 | Leavell | Sept. 5, 1944 |
| 2,412,061 | Quidas | Dec. 3, 1946 |
| 2,503,740 | Jelinek | Apr. 11, 1950 |
| 2,715,784 | Genest | Aug. 23, 1955 |